July 2, 1968  L. WALLERSTEIN, JR  3,390,873
SPRING

Filed Aug. 1, 1966  3 Sheets-Sheet 1

INVENTOR
Leon Wallerstein Jr
BY Ralph Hammar
ATTORNEY

July 2, 1968  L. WALLERSTEIN, JR  3,390,873
SPRING
Filed Aug. 1, 1966  3 Sheets-Sheet 2
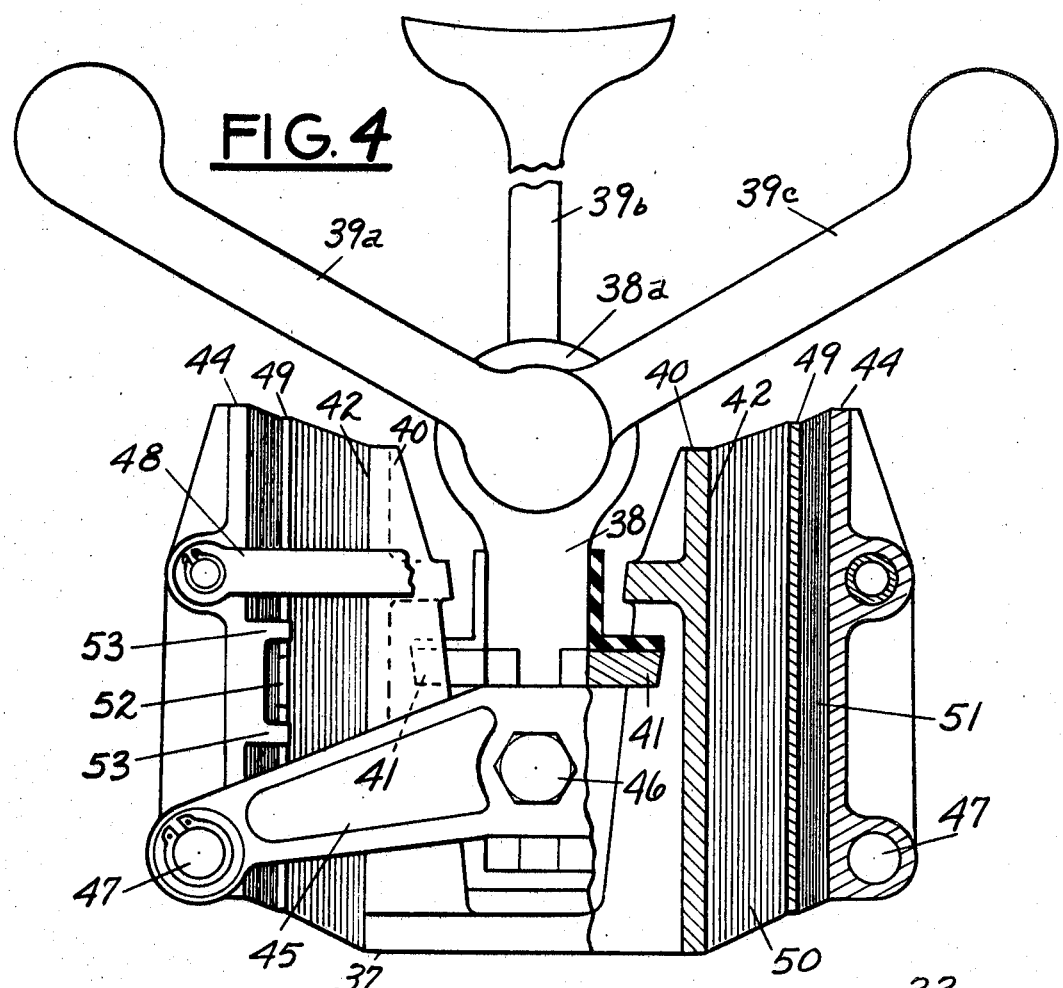
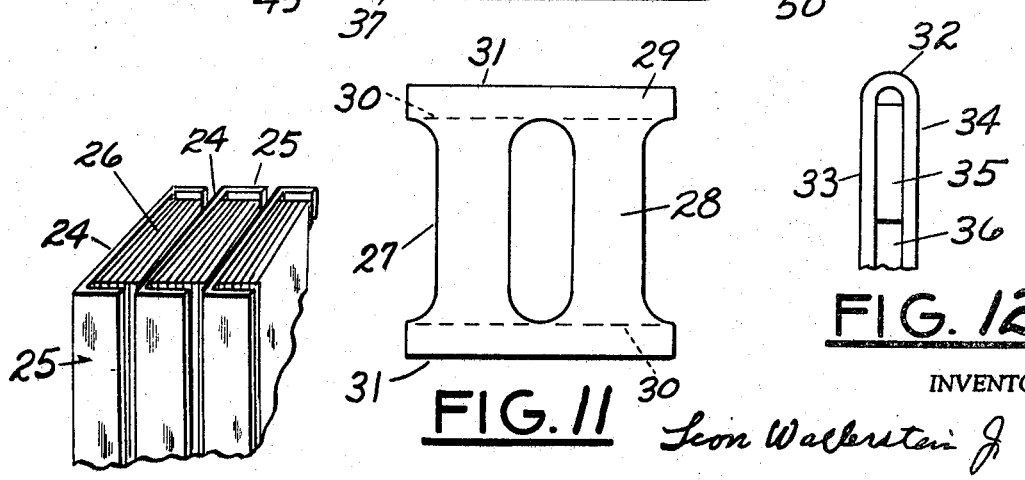
INVENTOR
Leon Wallerstein Jr
BY Ralph Hammar
ATTORNEY INVENTOR
Leon Wallerstein Jr
BY Ralph Hammar
ATTORNEY

United States Patent Office 3,390,873
Patented July 2, 1968

3,390,873
SPRING
Leon Wallerstein, Jr., Erie, Pa., assignor to Lord Corporation, Erie, Pa., a corporation of Pennsylvania
Continuation-in-part of application, Ser. No. 356,158, Mar. 31, 1964. This application Aug. 1, 1966, Ser. No. 569,137
11 Claims. (Cl. 267—1)

This application is a continuation-in-part of application Ser. No. 356,158 filed Mar. 31, 1964, now abandoned, and includes structure for increasing the load carrying ability and service life of springs having stacked laminations connected in series to load adjacent laminations edgewise alternately in tension and compression in the planes of the strips. In a preferred form, the spring comprises a series of laminations of spring material in face to face contact engagement connected in series and loaded alternately in tension and compression by connecting one end of each lamination to one neighboring lamination and by connecting the opposite end to its other neighboring lamination. This provides a high capacity spring capable of a large deflection in a small space. The connections between adjacent laminations are stiffened to prevent bending of the laminations, thus increasing the load carrying ability.

Figure 1:
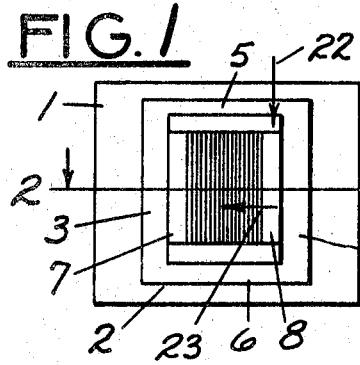
Figure 3:
Figure 2:
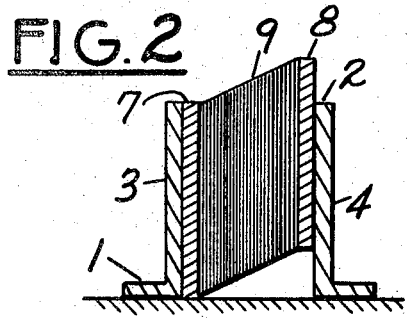
Figures 5, 6:
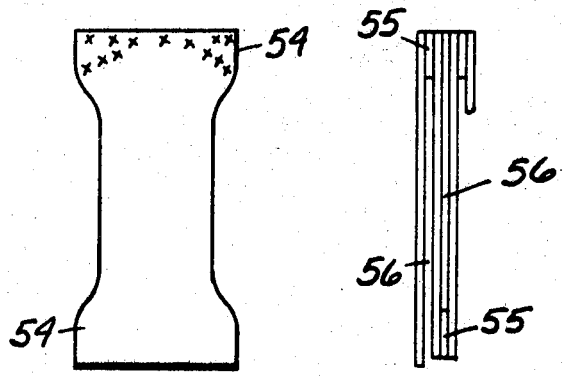
Figure 7:
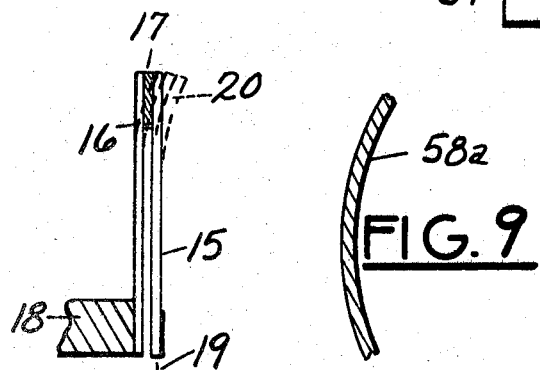
Figure 9:
Figure 8:
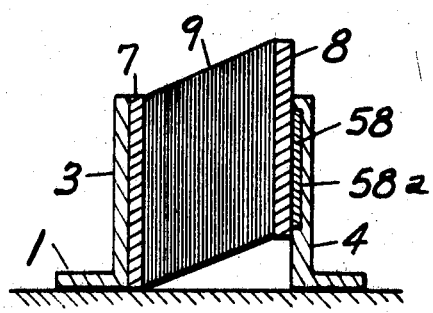
Figure 13:
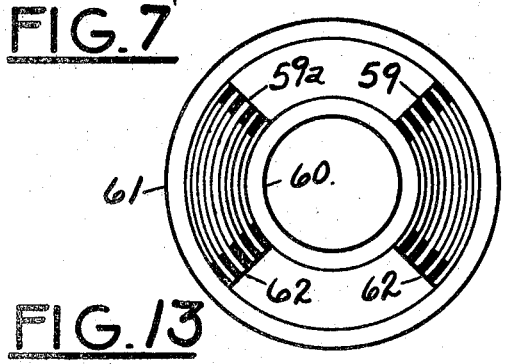
Figure 14:
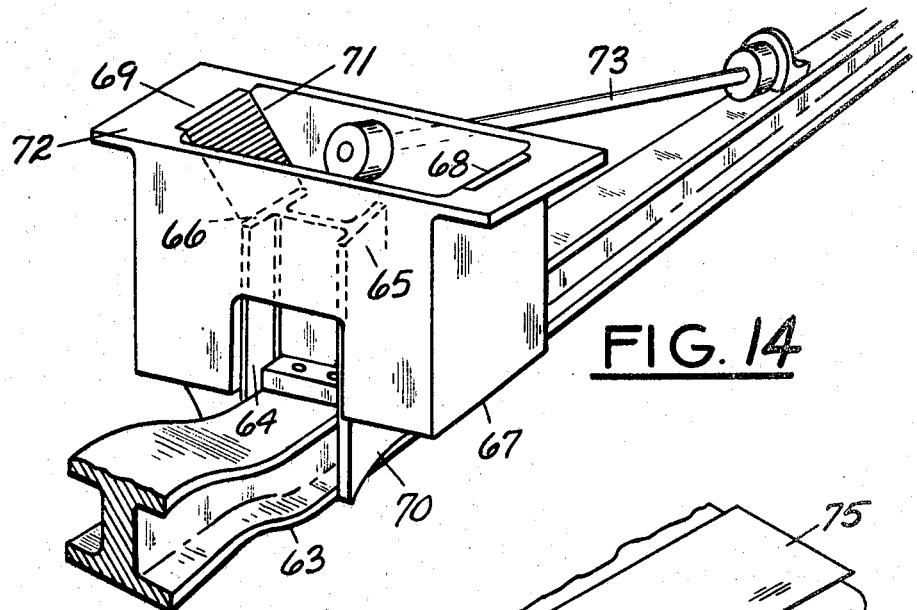
Figure 15:
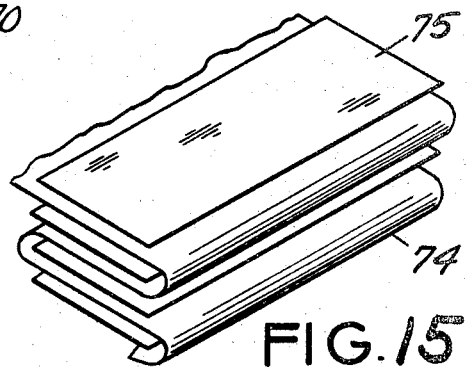
Figure 16:
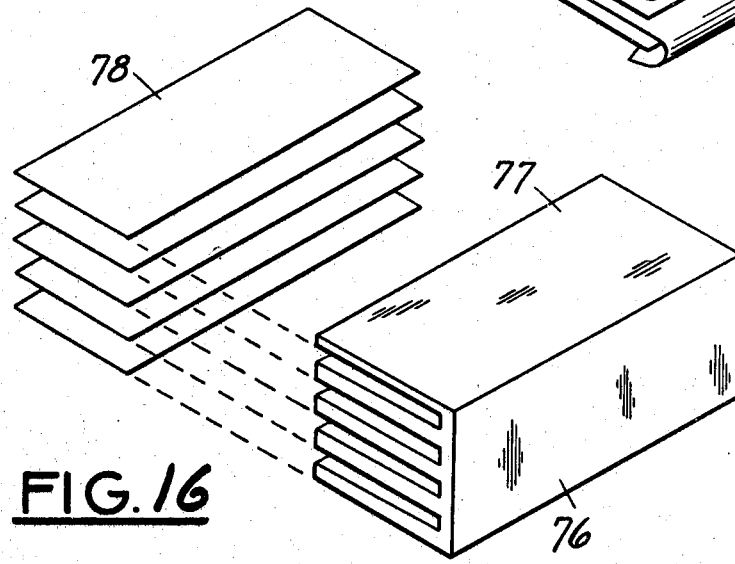
Figure 10A:
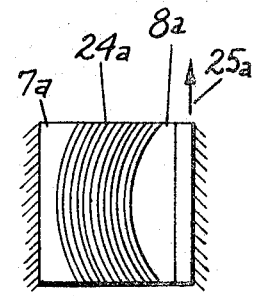

In the drawing, FIG. 1 is a top plan view of a spring, FIG. 2 is a sectional side view of the spring, FIG. 3 is a diagrammatic view showing the fabricated or folded strip extended to show the construction, FIG. 4 is a side elevation partly in section of an aircraft turbine mounting, FIG. 5 is a view showing the form of one of the laminations, FIG. 6 is a fragmentary edge view of a few laminations, FIG. 7 is a diagrammatic view illustrating the bending tendency of adjacent laminations in response to load, FIG. 8 is a side elevation of a modification, FIG. 9 is a view of the spring for setting the damping of the FIG. 8 modification, FIG. 10 is a perspective of another modification for increasing the load carrying ability by restraining bending of the laminations, FIG. 10a is an end view of another modification, FIG. 11 is a plan view of an alternative form of lamination, FIG. 12 is a fragmentary edge view of another construction for increasing the load carrying ability, FIG. 13 is an end view of a torsion spring having arcuate circumferentially extending elements, FIG. 14 is a perspective of a front axle spring, and FIGS. 15 and 16 are diagrammatic views showing the insertion of lubricating material between the laminations.

In the mounting of FIG. 1, the supporting member has a base 1 with a housing 2 having spaced parallel walls 3 and 4 joined by connecting walls 5 and 6. Within the housing is a mounting having a plate 7 fixed to the wall 3 and plate 8 slidably engaging the inner surface of the wall 4. The load is applied to the plate 8 and is transmitted to the supporting member through a series of laminations 9 of sheet spring material such as steel, etc. in which adjacent sheets or laminations are stressed alternately in compression and tension. The spacing between the plates 7 and 8 is approximately equal to the sum of the thickness of the individual laminations or sheets 9 so the individual sheets cannot buckle because they are confined in face to face engagement with each other. The spring may be made by folding a continuous strip transverse to its length. It may also be made by arranging the individual laminations side by side and securing alternate edges together by adhesives, soldering or welding as indicated at 11.

In FIG. 3, the individual plates or laminations are spread apart to provide access to the abutting edges of the laminations to be soldered or welded. When assembled between the plates 7, 8, the laminations lie flat against each other. When the folded strip shown in FIG. 3 is loaded in the direction of arrow 12, the lamination 13 is loaded in tension while the lamination 14 is loaded in compression. This pattern of alternate loading in tension and compression is repeated throughout the length of the strip. If the laminations were spread apart as shown in FIG. 3, there would be buckling of the laminations such as 14 loaded in compression producing stress concentrations which would limit the safe load to be carried. However, when the individual laminations are in substantial face to face engagement, as shown in FIGS. 1 and 2, buckling is not possible and the stress distribution is uniform throughout the strip. At the soldered or welded joints, there is a shearing stress, but the section of the soldered or welded joints is such that the load can be carried in shear.

It has been observed that the stiffness of the spring under load may be substantially (up to 50% has been observed) less than the theoretical stiffness calculated from the cross section, length and modulus of the laminations. This is due to the fact that the laminations are not perfectly flat and there is sufficient space to permit curling or bending of the laminations at the joined ends. The mechanism by which this takes place is shown in FIG. 7 where two adjacent laminations 15 and 16 are united at their adjacent upper ends 17. The lower end of the lamination 16 is fixed to a stationary support 18 and the lower end of the lamination 15 is loaded by the force indicated by arrow 19. The application of the force would cause the laminations 15 and 16 to assume the position indicated by dotted lines 20 where the laminations are now stressed in bending in addition to tension and compression. Bending of the laminations reduces the spring stiffness and also causes additional stress which reduces the load carrying ability. Only a small amount of bending or curling of the joined ends is required to effect a 25-50% reduction in stiffness. Space for such bending results from accumulation of minute clearances between shims which results from lack of perfect flatness of the shims. To prevent the bending or curling of the joined ends, it is proposed that the joined ends be stiffened. The soldered or welded joints 11 have a stiffening effect and should extend lengthwise along the laminations several times the thickness of the individual laminations. The thinner the lamination the greater the relative extension. With .010" thick laminations, extensions of 20 to 40 times the thickness may be necessary. With thicker shims, having relatively greater bending resistance, 5 to 10 times the thickness is sufficient. This increases the section modulus of the joined ends enough to prevent bending or curling. Other expedients for increasing the section modulus of the joined ends are shown in FIGS. 10, 10a, 11 and 12. In FIG. 10, the laminations 24 of channel section are distributed at periodic intervals. Each lamination 24 has flanges 25 which preferably straddle the intervening pairs of laminations 26 between it and the next lamination 24. The laminations 24 may also be made of heavier or thicker stock. Laminations 24, if made of substantially thicker material would not have to be channel shaped; it would be sufficiently resistant to bending due to its thickness. The effect of the laminations 24 is to inhibit bending of the joined ends of the intervening plain laminations, and to prevent buckling of the shims.

In FIG. 10a the laminations 24a are each curved about a longitudinal axis parallel to the length of the laminations. The laminations are connected end to end as shown in FIG. 3. The lamination at one end of the stack is connected to stationary member 7a and the lamination at the opposite end of the stack is connected to movable member 8a. The laminations 24a are stiffer so as to prevent buckling and to resist the bending illustrated in FIG.

7. The spring is also stiffer in the direction of arrow 25a.

In FIG. 11, the laminations 27 have relatively narrow load carrying sections 28 connected to enlarged end sections 29 preferably welded throughout the area between lines 30 and 31. In the particular form shown in FIG. 11, the joined ends (between the lines 30 and 31) have a length several times the thickness of the laminations and a width several times the width of the load carrying sections of the laminations.

In FIG. 12, sheet metal or other spring stock is folded to provide a joint 32 connecting the ends of adjacent laminations 33, 34. The joint 32 by itself is not stiff enough or strong enough. To increase the stiffness, a spacer 35 of length equal to many times the thickness of the individual laminations is welded between the laminations to stiffen the joint 32. In a particular spring having 0.18″ shims, a spacer .25″ long has been used. The spacer 35 also provides space for a strip 36 of one of the solid lubricant's such as a fluorocarbon (for high temperature use) or other elastomer or plastic (for lower temperature use).

From the point of view of compactness, the space required of the mounting is determined by the length and width of the individual laminations and by the sum of the thicknesses of the laminations. However, from the point of view of spring rate, the mounting has the effective stiffness of a strip having a length equal to the sum of the lengths of the laminations. For example, with 100 laminations of high strength steel .010 of an inch thick and having a length of one inch and a width of one inch, the working element, that is, the strip connected between the plates 7 and 8, would occupy a space of one inch by one inch by one inch. The plate 8 when loaded with 1,000 pounds would move vertically ⅓ of an inch. This would correspond to the deflection of a strip of steel 100 inches long, one inch wide and 0.10 inch thick, supported at its upper end and carrying 1,000 pound load at its lower end. This example is not intended to limit the springs to heavy loads. The springs may be used for light loads and for much heavier loads. For example, with a spring carrying 40 pounds and deflecting ¼ inch, a representative design could have 140 laminations each ¼ inch wide, ½ inch long and 1½ mils thick, and the cube containing the working element would be ¼ by ½ by .210 inch. With the laminations thicker and wider, springs suitable for railway freight cars can be made occupying only a fraction of the space now required for the usual coil springs.

When the FIG. 1 spring is loaded in shear or in the direction of arrow 22, the working element of the spring is somewhat softer and the stress is less uniform. It is, accordingly, preferable that the major load be applied in the direction to stress the laminations in direct stress (tension or compression) rather than in shear. The spring will, however, tolerate an appreciable shear load.

In the direction normal to the laminations or in the direction of arrow 23, the spring is virtually incompressible because the individual laminations are in substantial contact or face to face engagement.

FIGS. 4, 5 and 6 show an aircraft turbine mounting having a base 37 to be attached to the airframe and a stem 38 having its upper end in the form of a ball joint 38a attached to arms 39a, 39b, 39c supporting the turbine. The base has upstanding sections 40 each loosely receiving an arm 41 on the stem 38. On the outer side 42 of each section 40 is fixed one end of a laminated spring. The other end of each spring is fixed to an end plate 44. Each spring substantially fills the space between the section 40 and the associated end plate. Load is transmitted from the turbine to the end plates through cross members 45 fixed at 46 to the stem and having outer ends pivoted at 47 to the lower ends of the end plates 44. The upper ends of the end plates are connected by parallel links 48 which cooperate with the cross members 45 to hold the end plates 44 parallel to the surfaces 42 while permitting pivotal movement. Vertical motion of the ball joint 38a produces vertical deflection of each spring. Lateral motion of the ball joint (left and right in the plane of the paper) causes one spring to deflect upwards and the other downwards. Fore and aft motion of the ball joint causes fore and aft shearing and in-plane cocking of the springs.

The spring has non-linear characteristics. Between each surface 42 and a rigid plate 49 the laminations 50 are about twice as thick as the laminations 51 between each plate 49 and the adjacent end plate 44. At low load, the deflection is shared by the laminations 50 and 51. At heavier loads lugs 52 on the plates 49 engage stops 53 on the end plates 44 and thereafter additional load is taken only by the thicker laminations 50 between the plates 49 and the surfaces 42 on the base 37.

The FIG. 4 spring has two stages. The number of stages may be increased to obtain a more gradual transition. In a limiting case, the individual pairs of laminations can progressively bottom and produce a continuous change in spring rate, which is controlled by the contour of the stops against which the laminations bottom. In addition to varying strength progressively by the thickness of the laminations, the laminations may be made of materials having different moduli.

The laminations 50 and 51 are of the shape shown in FIG. 5, each having enlarged ends 54 welded together through an intermediate metal spacer 55 of the same thickness as strips 56 of solid lubricating material. This construction increases the section modulus of the joined ends to prevent bending or curling under load which would decrease the load carrying ability.

FIG. 8 is similar to FIGS. 1 and 2 and corresponding parts are indicated by the same reference numerals. In order to provide increased damping, the wall 4 has a recess 58 for a bowed leaf spring 58a. When the mounting is assembled, the spring 58a is flattened and develops a spring force holding the plate compressed against the spring element. By varying the strength of the bowed spring 58a, different degrees of damping are obtained.

In FIG. 13 there are several spring elements 59, 59a each comprising tangentially extending laminations substantially filling the radial space between members 60, 61. The individual laminations between the members 60, 61 are connected in series by staggered welds 62 so torsion forces load the laminations alternately in compression and tension and provide a spring which is soft in torsion. The spring is virtually rigid under radial loads.

In FIG. 14, 63 indicates one end of an automotive front axle having fixed to its upper side an upstanding vertical rigid member 64 with front and back vertical faces 65, 66 respectively presented fore and aft of the vehicle. The spring system comprises a box member 67 telescoped over the member 64 and having vertical surfaces 68, 69 respectively parallel to and presented toward the surfaces 65 and 66. A spring 70 has one end lamination fixed to the surface 65 and its other end lamination fixed to the surface 68. A spring 71 has one end lamination fixed to the surface 66 and its other end lamination fixed to the surface 69. The laminations are in direct contact and are lubricated by a grease. The vehicle frame is suitably fixed to a flange 72 at the upper end of member 67 and is supported on the axle by springs 70, 71. Movement of the vehicle frame fore and aft of the axle (transverse to the laminations) is prevented by the springs which are virtually incompressible in this direction. This suggests that three or more springs distributed about an axis could provide for movement along the axis while preventing movement transverse to the axis. A single spring as shown in FIG. 1 or two springs as shown in FIGS. 4 and 14 permit motion in directions parallel to the laminations, both lengthwise and crosswise. Three or more springs distributed about an axis with the laminations extending lengthwise of the axis permit only motion lengthwise of the laminations so the combination becomes self guided. In the particular construction, some rocking of the axle is desired and movement of the vehicle frame endwise of the axle is prevented by a radius rod 73 connected between the axle and member 67.

FIGS. 15 and 16 show diagrammatically structure for interleaving solid lubricant films between the laminations. In FIG. 15, the lubricant film 74 is wrapped sinuously from side to side over adjacent laminations 75. In FIG. 16, a comb 76 of solid lubricant has teeth 77 inserted laterally between adjacent laminations 78.

The elastomer used as a solid lubricant may be bonded to one or both of the adjacent laminations. If bonded to one lamination, small amplitude vibrations shear the elastomer and large amplitude vibrations cause slippage of the unbonded lamination. If bonded to both laminations, all vibrations shear the elastomer. The full bonded construction eliminates wear.

In all of the springs the individual elements are stressed lengthwise in direct stress (tension and compression) so the stress is uniformly distributed and derive lateral support from each other so buckling is prevented. The substantial contact or engagement between adjacent elements permits lubrication by capillary action to prevent fretting, galling, or wear by the relative movement. Surface treatment and dry or solid lubricants may be used in place of fluid lubricants and grease.

What is claimed as new is:

1. A spring comprising supporting and supported members having opposed longitudinally extending faces in parallel relation to each other, means for guiding the supported member for longitudinal movement relative to the supporting member while maintaining said parallel relation, a stack of a plurality of sheets of resilient material substantially filling the space between said faces, adjacent sheets in the stack being in face to face sliding engagement, connections at one end of the stack between the edges of adjacent sheets, other connections at the opposite end of the stack in staggered relation to the first connections and between edges of different adjacent sheets whereby the sheets are connected longitudinally in series from edge to edge, a load transmitting connection to the supported member at one side of the stack loading the sheets edgewise, a load receiving connection to the supporting member at the opposite side of the stack, and means for stiffening the joined edges of the sheets to restrain bending of the joined edges transverse to the thickness of the sheets to increase the load carrying ability of the spring.

2. The spring of claim 1 in which the stiffening means comprises a plurality of channel shaped sheets dispersed throughout the stack connected longitudinally in series with the other sheets in the stack, said channel shaped sheets each having longitudinally extending flanges straddling the longitudinal edges of a plurality of the other sheets in the stack.

3. The spring of claim 1 in which the stiffening means comprises enlarged ends on the connected sheets at the connections.

4. The spring of claim 1 in which the stiffening means comprises rigid spacers sandwiched and fastened between the connected sheets.

5. The spring of claim 4 having strips of solid lubricating material sandwiched between the connected sheets.

6. A spring comprising supporting and supported members having opposed longitudinally extending faces in parallel relation to each other, means for guiding the supported member for longitudinal movement relative to the supporting member while maintaining said parallel relation, a stack of a plurality of sheets of resilient material substantially filling the space between said faces, the sum of the thickness of the sheets in the stack being substantially equal to the space between the opposed faces, the lateral edges of the sheets in the stack being exposed and free to move in shear with respect to each other in all directions edgewise of the sheets, adjacent sheets in the stack being in face to face sliding engagement, connections between the longitudinal edges of adjacent sheets at one end of the stack, other connections at the opposite end of the stack in staggered relation to the first connections and between the longitudinal edges of different adjacent sheets whereby the sheets are connected longitudinally in series from edge to edge, a load transmitting connection to the supported member at one side of the stack loading the sheets edgewise, and a load receiving connection to the supporting member at the opposite side of the stack.

7. The spring of claim 6 in which said connections between the longitudinal edges of adjacent sheets have soldered or welded sections such that the edgewise loads of the sheets can be carried in shear without breaking the connections.

8. The spring of claim 6 in which the sheets are arcuate and concentric and the ends of the stack having said connections are angularly spaced.

9. The spring of claim 6 having spring means exerting a force on at least one of the supporting and supported members in the thickness direction for compressing the sheets in the stack to determine the degree of friction damping.

10. The spring of claim 6 in which said spring means is a bowed leaf spring.

11. A spring comprising supporting and supported members having opposed longitudinally extending faces in parallel relation to each other, means for guiding the supported member for longitudinal movement relative to the supporting member while maintaining said parallel relation, a stack of a plurality of sheets of resilient material substantially filling the space between said faces, said sheets each being curved about an axis parallel to its length, adjacent sheets in the stack being in face to face sliding engagement, connections at one end of the stack between the edges of adjacent sheets, other connections at the opposite end of the stack in staggered relation to the first connections and between edges of different adjacent sheets whereby the sheets are connected longitudinally in series from edge to edge, a load transmitting connection to the supported member at one side of the stack loading the sheets edgewise, and a load receiving connection to the supporting member at the opposite side of the stack.

References Cited

UNITED STATES PATENTS

| | | | |
|---|---|---|---|
| 1,619,346 | 3/1927 | Houston et al. | 267—47 |
| 2,828,801 | 4/1958 | Papst | 267—1 |
| 2,885,067 | 5/1959 | Morris | 267—1 |

FOREIGN PATENTS 497,546  9/1919  France.

ARTHUR L. LA POINT, *Primary Examiner.*

R. M. WOHLFARTH, *Assistant Examiner.*